(12) United States Patent
Ni et al.

(10) Patent No.: US 10,613,375 B2
(45) Date of Patent: Apr. 7, 2020

(54) BACKLIGHT MODULE AND LIQUID CRYSTAL DISPLAY DEVICE

(71) Applicants: BOE Technology Group Co., Ltd., Beijing (CN); Hefei Xinsheng Optoelectronics Technology Co., Ltd., Hefei (CN)

(72) Inventors: Huan Ni, Beijing (CN); Xiaolong Xie, Beijing (CN); Qun Li, Beijing (CN); Xinxia Zhang, Beijing (CN); Xiao Guo, Beijing (CN)

(73) Assignees: BOE TECHNOLOGY GROUP CO., LTD., Beijing (CN); HEFEI XINSHENG OPTOELECTRONICS TECHNOLOGY CO., LTD, Anhui (CN)

( * ) Notice: Subject to any disclaimer, the term of this patent is extended or adjusted under 35 U.S.C. 154(b) by 0 days.

(21) Appl. No.: 16/066,128

(22) PCT Filed: Dec. 11, 2017

(86) PCT No.: PCT/CN2017/115502
§ 371 (c)(1),
(2) Date: Jun. 26, 2018

(87) PCT Pub. No.: WO2018/161669
PCT Pub. Date: Sep. 13, 2018

(65) Prior Publication Data
US 2019/0146273 A1 May 16, 2019

(30) Foreign Application Priority Data
Mar. 6, 2017 (CN) .......................... 2017 1 0128124

(51) Int. Cl.
*G02F 1/1335* (2006.01)
*F21V 8/00* (2006.01)
(Continued)

(52) U.S. Cl.
CPC ..... *G02F 1/133602* (2013.01); *G02B 3/0006* (2013.01); *G02B 5/04* (2013.01);
(Continued)

(58) Field of Classification Search
CPC ...... G02B 6/00; G02B 6/0055; G02B 6/0016; G02B 6/0031; G02B 6/005; G02B 6/0053;
(Continued)

(56) References Cited

U.S. PATENT DOCUMENTS 6,191,833 B1 * 2/2001 Hirakata .............. G02B 6/0053
349/137
2004/0105046 A1 6/2004 Taira et al.
(Continued)

FOREIGN PATENT DOCUMENTS

| CN | 1291729 A | 4/2001 |
|---|---|---|
| CN | 101482630 A | 7/2009 |

(Continued)

OTHER PUBLICATIONS

International Search Report (including English translation) and Written Opinion of PCT/CN2017/115502, dated Feb. 24, 2018.

*Primary Examiner* — Thoi V Duong
(74) *Attorney, Agent, or Firm* — Fay Sharpe LLP

(57) ABSTRACT

Provided are a backlight module and a liquid crystal display device. The backlight module includes: a backlight source structure layer; and a first convex lens structure layer, a second convex lens structure layer and a prism layer that are sequentially arranged at a light-emergent side of the backlight source structure layer. The parallel lights emitted from the backlight source structure layer are converged to a focal point of the second convex lens structure layer after passing through the first convex lens structure layer, and transformed into the parallel light beam after passing through the second
(Continued)

convex lens structure layer. The parallel lights are transformed to parallel light beam in a convergence state from an original well-distributed state. The parallel light beam is refracted for multiple times after passing through the prism layer to realize light splitting, so that lights with different colors are refracted.

17 Claims, 3 Drawing Sheets

(51) Int. Cl.
*G02B 5/04* (2006.01)
*G02B 3/00* (2006.01)
*G02B 27/10* (2006.01)
*G02B 27/12* (2006.01)

(52) U.S. Cl.
CPC ............. *G02B 5/045* (2013.01); *G02B 6/003* (2013.01); *G02B 6/0053* (2013.01); *G02B 27/1006* (2013.01); *G02B 27/126* (2013.01); *G02F 1/133526* (2013.01); *G02F 1/133606* (2013.01); *G02F 2001/133607* (2013.01)

(58) Field of Classification Search
CPC .... G02B 6/003; G02B 6/0035; G02B 6/0068; G02B 6/0073; G02B 5/045; G02B 5/1814; G02B 5/04; G02B 5/00; G02B 5/201; G02B 19/0028; G02B 26/0883; G02B 3/0006; G02B 3/005; G02B 3/00; G02B 3/0037; G02B 3/0062; G02B 17/0856; G02B 27/123; G02B 27/126; G02B 27/285; G02B 7/027; G02F 1/1336; G02F 1/133606; G02F 1/133609; G02F 1/133603; G02F 1/133526; G02F 1/133611; G02F 1/133621; G02F 1/1333; G02F 1/133602; G02F 1/133605; G02F 1/133607; G02F 1/1335; G02F 1/133504; G02F 1/133524; G02F 1/133553; G02F 2001/133607; G02F 2001/133622; G02F 2001/133507; G02F 2001/133623; G02F 2201/52

See application file for complete search history.

(56) References Cited

U.S. PATENT DOCUMENTS

| 2004/0109314 | A1* | 6/2004 | Yang ................... G02B 6/0021 362/245 |
| 2005/0041174 | A1 | 2/2005 | Numata et al. |
| 2009/0161213 | A1* | 6/2009 | Lin ...................... G02B 3/0068 359/485.01 |
| 2009/0323194 | A1* | 12/2009 | Lin ...................... G02B 6/0036 359/639 |
| 2011/0051046 | A1* | 3/2011 | Kim ......................... G02B 5/02 349/65 |

FOREIGN PATENT DOCUMENTS

| CN | 101634753 | A | 1/2010 |
| CN | 101916008 | A | 12/2010 |
| CN | 106908993 | A | 6/2017 |
| JP | 10-142598 | * | 5/1998 ........... G02F 1/1335 |

* cited by examiner

BACKLIGHT MODULE AND LIQUID CRYSTAL DISPLAY DEVICE

CROSS-REFERENCE TO RELATED APPLICATION

This application is a 371 of PCT Patent Application Serial No. PCT/CN2017/115502 filed Dec. 11, 2017, which claims priority to Chinese Patent Application No. 201710128124.1, filed with State Intellectual Property Office on Mar. 6, 2017 and titled "BACKLIGHT MODULE AND LIQUID CRYSTAL DISPLAY DEVICE", the entire contents of which are incorporated herein by reference.

TECHNICAL FIELD

The present disclosure relates to a backlight module and a liquid crystal display device.

BACKGROUND

A liquid crystal display apparatus includes an array substrate, a color film substrate, a liquid crystal layer between the array substrate and the color film substrate, a backlight source, a polarizer and the like, where the color film substrate includes a plurality of color sub-pixels which are generally set to be red, green and blue. After passing through the color film substrate, light emitted from the backlight source will be transmitted to be light with corresponding sub-pixel colors, thereby realizing color display. The transmittance of the liquid crystal display apparatus is affected by factors such as the backlight light, transmittance of the polarizer, transmittance of the liquid crystal layer, transmittance of the color film, aperture ratio and etc. The color sub-pixels of the color film will absorb light with other colors, resulting in a light transmittance of only 30% and a low light utilization.

SUMMARY

There are provided in the present disclosure a backlight module and a liquid crystal display device.

In one aspect of the present disclosure, there is provided a backlight module, including: a backlight source structure layer; a first convex lens structure layer, a second convex lens structure layer and a prism layer that are sequentially arranged at a light-emergent side of the backlight source structure layer, where the first convex lens structure layer and the second convex lens structure layer are configured to converge parallel lights emitted from the backlight source structure layer into a parallel light beam; and the prism layer is configured to refract lights with different colors in the parallel light beam into sub-pixels with colors corresponding to the different colors.

Optionally, the backlight module further includes a refracting layer arranged between the second convex lens structure layer and the prism layer and configured to refract the parallel light beam onto the prism layer.

Optionally, a plurality of first convex lenses are arranged on the first convex lens structure layer; a plurality of second convex lenses are arranged on the second convex lens structure layer; a plurality of prisms are arranged on the prism layer; and a diameter of the first convex lens is greater than a diameter of the second convex lens, and focal points of the first convex lens and the second convex lens on opposite sides are overlapped.

Herein, the first convex lens is configured to converge the parallel lights emitted from the backlight source structure layer to a focal point of the second convex lens close to the first convex lens; the second convex lens is configured to converge divergent lights emitted at the focal point of the second convex lens into the parallel light beam and emit the parallel light beam onto the refracting layer; and the refracting layer is configured to refract the parallel light beam, so that the parallel light beam is incident on the prism at a specific angle.

Optionally, the plurality of first convex lenses are arranged in a matrix; the plurality of second convex lenses are arranged in a matrix; and the plurality of prisms are arranged in a matrix.

Optionally, the first convex lens and the second convex lens are plano-convex lenses; and both a convex surface of the first convex lens and a convex surface of the second convex lens are arranged close to the backlight source structure layer.

Optionally, the prism is a triangular prism.

Optionally, a light-incident surface of the triangular prism is parallel to a light-emergent surface of the refracting layer.

Optionally, the plurality of first convex lenses, the plurality of second convex lenses and the plurality of prisms are in one-to-one correspondence.

Optionally, the parallel lights emitted from the backlight source structure layer are white lights including red light, green light and blue light.

Optionally, the prism is configured to split the lights with different colors in the parallel light beam through refraction for two times and make the refracted lights with different colors perpendicularly incident on the sub-pixels with corresponding colors.

Optionally, the backlight source structure layer includes a light source and a light guide plate that are sequentially arranged; and the light guide plate is arranged close to the first convex lens structure layer.

Optionally, the backlight source structure layer includes a light source and a light guide plate, and the light source is arranged at a side surface of the light guide plate.

Optionally, the backlight source structure layer further includes a reflecting layer, the reflecting layer is a film layer in the backlight source structure layer away from the first convex lens structure layer; and a reflecting surface of the reflecting layer faces towards the first convex lens structure layer.

There is provided in another aspect of the present disclosure a liquid crystal display device including a backlight module and a display panel, where the backlight module is the backlight module according to any one of the above embodiments and is configured to provide backlight for the display panel, and the display panel includes the sub-pixels.

Optionally, the display panel includes a plurality of pixels, and a plurality of prisms arranged on the prism layer are in one-to-one correspondence with the plurality of pixels.

Optionally, each of the pixels includes a plurality of the sub-pixels with different colors.

Optionally, each of the pixels includes at least three sub-pixels with different colors.

Optionally, the at least three sub-pixels with different colors include a red sub-pixel, a green sub-pixel and a blue sub-pixel.

Optionally, where a diameter of the first convex lens is equal to a width of the pixel, and a diameter of the second convex lens is ⅓-½ of the diameter of the first convex lens.

Optionally, the display panel is a liquid crystal display panel.

DETAILED DESCRIPTION

In order to make the principles and advantages of the present disclosure clearer, embodiments of the present disclosure are described in detail below with reference to the accompanying drawings. It should be noted that the embodiments of the present disclosure and the features therein can be combined arbitrarily in the case of no conflict.

Although various details are set forth in the following description for a thorough understanding of the present disclosure, other implementations different from those described may also be employed herein. Therefore, the protection scope of the present disclosure is not limited by the embodiments disclosed below.

A backlight module and a liquid crystal display device in some embodiments of the present disclosure will be described hereinafter with reference to the accompanying drawings.

Figure 1:
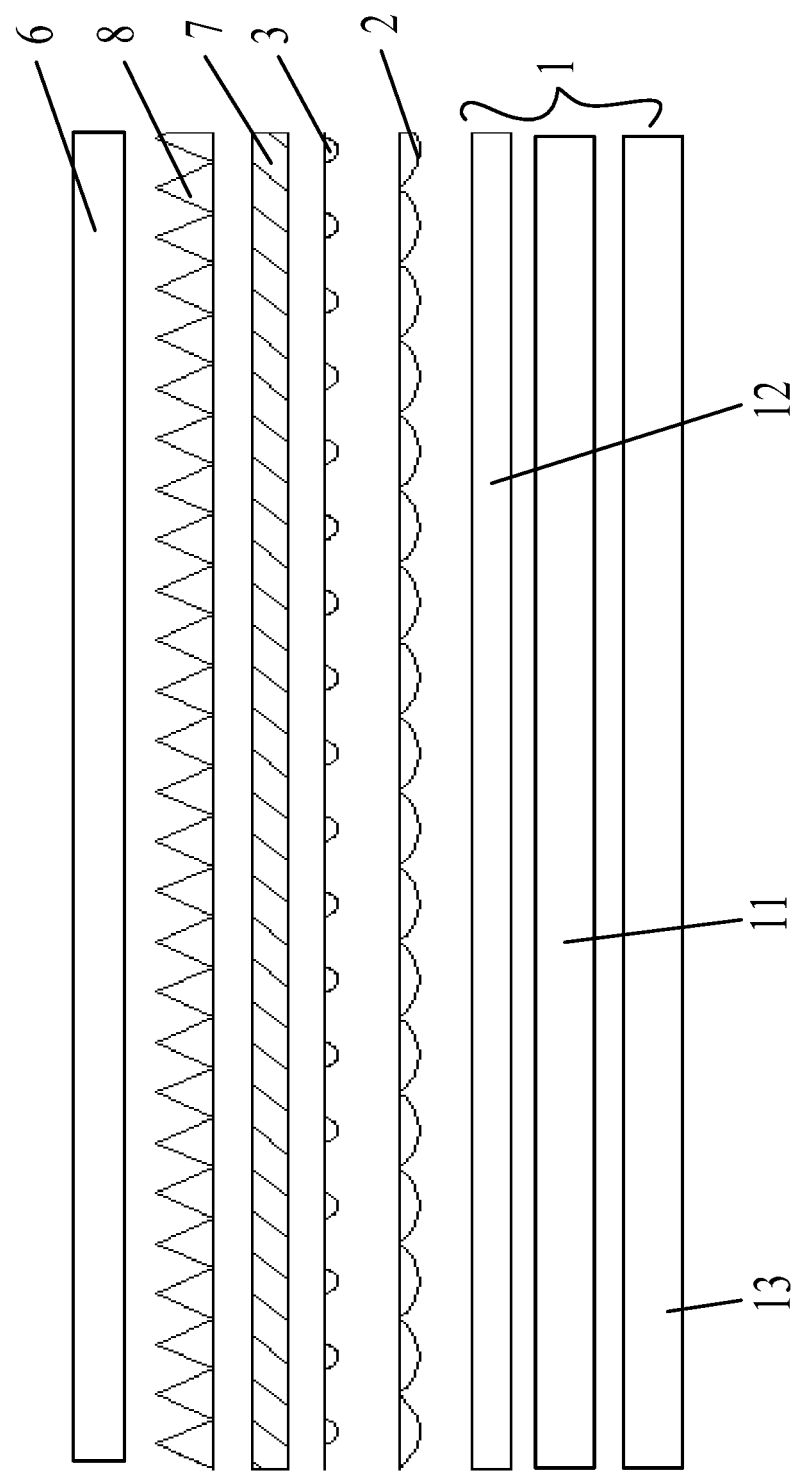
FIG. 1 is a schematic diagram of a structure of a backlight module illustrated by an embodiment of the present disclosure.
Figure 2:
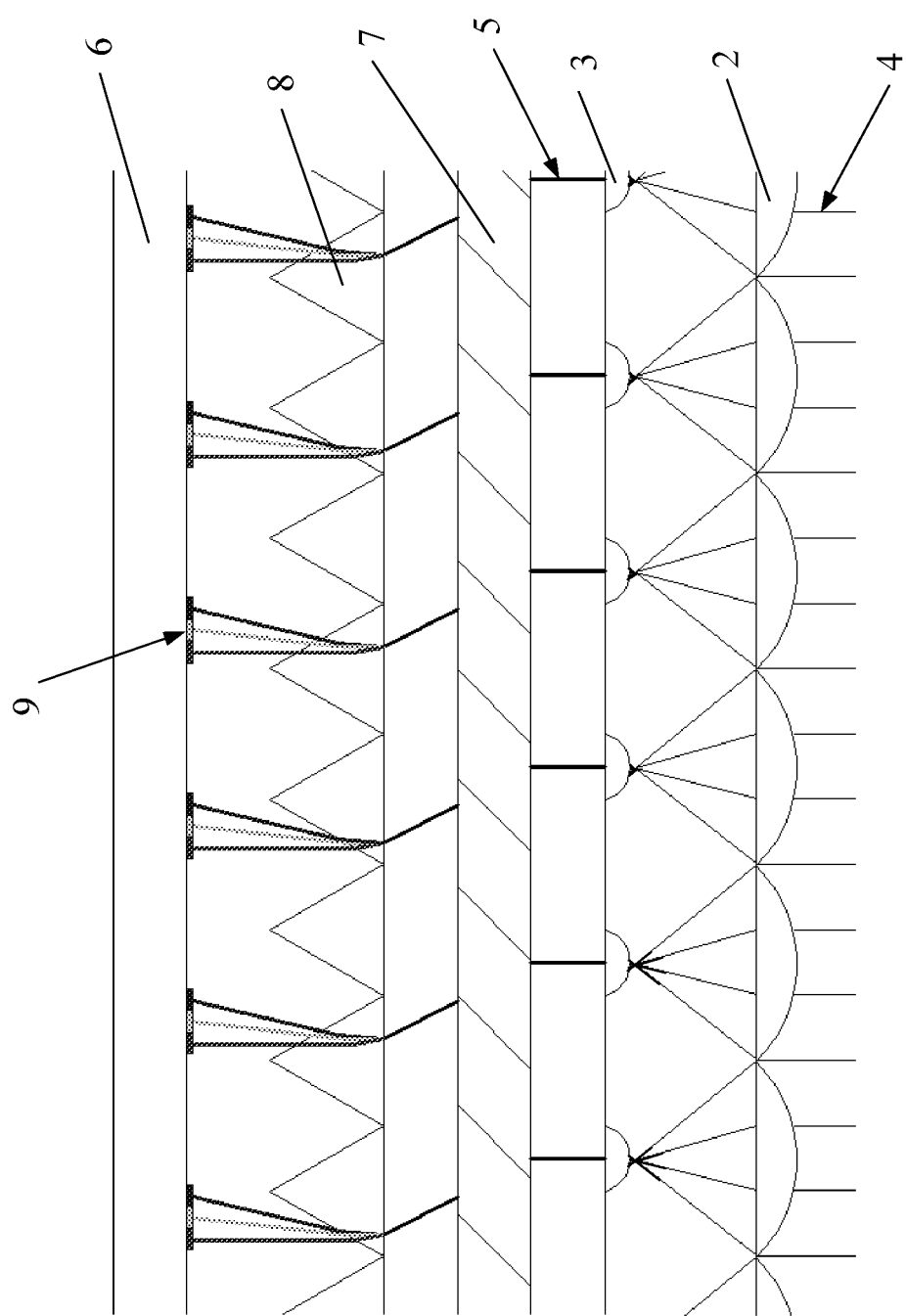
FIG. 2 is a schematic diagram of a partial structure of the backlight module illustrated in FIG. 1 in a light-emitting state.

FIG. 1 shows a schematic diagram of a structure of a backlight module illustrated by an embodiment of the present disclosure, and FIG. 2 shows a schematic diagram of a partial structure of the backlight module illustrated in FIG. 1 in a light-emitting state.

As shown in FIG. 1 and FIG. 2, a backlight module provided in the present disclosure includes: a backlight source structure layer 1; a first convex lens structure layer 2, a second convex lens structure layer 3 and a prism layer 8 that are sequentially arranged at a light-emergent side of the backlight source structure layer 1; where the first convex lens structure layer 2 and the second convex lens structure layer 3 are used to converge parallel lights 4 emitted from the backlight source structure layer 1 into a parallel light beam 5; and the prism layer 8 is used to refract lights with different colors in the parallel light beam 5 into sub-pixels 9 with colors corresponding to the different colors.

In the backlight module provided in the present disclosure, the parallel light 4 emitted from the backlight source structure layer 1 is converged to a focal point (a focal point of a second convex lens on the second convex lens structure layer 3) of the second convex lens structure layer 3 after passing through the first convex lens structure layer 2, and then is transformed into the parallel light beam 5 after passing through the second convex lens structure layer 3. The parallel light 4 is transformed to be in a convergence state from an original well-distributed state. The parallel light beam 5 is then refracted for multiple times after passing through the prism layer 8 to realize light splitting, so that lights with different colors are refracted. The lights with different colors are respectively incident on sub-pixels with colors corresponding to the different colors. Therefore, the transmittance of the light is improved and thus the purposes of increasing the energy efficiency utilization ratio and reducing the energy consumption of products are achieved.

Optionally, as shown in FIGS. 1 and 2, the backlight module further includes a refracting layer 7 arranged between the second convex lens structure layer 3 and the prism layer 8 and used to refract the parallel light beam 5 to the prism layer 8, so that the parallel light beam 5 perpendicularly incident on the refracting layer 7 exits obliquely from the refracting layer 7. As such, the parallel light beam 5 is obliquely incident on the prism layer 8, and thus can be better refracted by the prism layer 8 for multiple times.

Exemplarily, a plurality of first convex lenses are arranged on the first convex lens structure layer 2. A plurality of second convex lenses are arranged on the second convex lens structure layer 3. A plurality of prisms are arranged on the prism layer 8. A diameter of the first convex lens is greater than a diameter of the second convex lens (realizing that a parallel light with a large cross-sectional area can be converged into a parallel light beam with a small cross-sectional area, and the parallel light beam with the small cross-sectional area can be seen as a light ray when it is small enough). Herein, focal points of the first convex lens and the second convex lens on opposite sides are overlapped (in FIG. 2, the diameter of the first convex lens is much greater than the diameter of the second convex lens, a distance from the overlapped focal point to the second convex point is much smaller than a distance from the overlapped focal point to the first convex lens, and a person skilled in the art should understand that it is difficult to clearly express the distance from the overlapped focal point to the second convex lens in FIG. 2 since it is a relatively small value).

Herein, the first convex lens is used to converge the parallel lights emitted from the backlight source structure layer to a focal point of the second convex lens (which is a focal point among focal points of the second convex lens. Divergent light is emitted from this focal point, and then irradiated to the second convex lens). The second convex lens is used to converge the divergent lights emitted from the focal point (i.e. the focal point, close to the first convex lens, among the focal points of the second convex lens) into the parallel light beam and irradiate the parallel light beam onto the refracting layer. The refracting layer is used to refract the parallel light beam, so that the parallel light beam can be incident on the prism at a specific angle. The prism is used to split the lights with different colors in the parallel light beam through refraction for multiple times and make the refracted lights with different colors incident on the sub-pixels with corresponding colors.

The parallel light 4 emitted from the backlight source structure layer 1 is converged to the focal point of the second convex lens after passing through the first convex lens, and then passes through the second convex lens to emit the parallel light beam 5. The parallel light beam 5 is refracted onto the prism after passing through the refracting layer 7, and then lights with different colors in the parallel light beam 5 are refracted into the sub-pixels 9 with corresponding colors via the prism, so as to reduce the light loss and increase the utilization ratio of the light.

Optionally, the plurality of first convex lenses may be arranged in a matrix, the plurality of second convex lenses may also be arranged in the matrix, and the plurality of prisms may also be arranged in the matrix. Optionally, both the first convex lens and the second convex lens may be plano-convex lenses, that is, each of the first convex lens and the second convex lens has a plane and a convex surface. Both of the convex surface of the first convex lens and the convex surface of the second convex lens are arranged close to the backlight source structure layer. The plane of the first convex lens and the plane of the second convex lens are arranged away from the backlight source structure layer.

Optionally, the prism is a triangular prism. A light-incident surface of the triangular prism is parallel to a light-emergent surface of the refracting layer 7. The lights with different colors in the parallel light beam 5 are split through refraction for two times and are then refracted at different positions and different emergent angles.

A deflection angle of emergent light on the prism relative to incident light satisfies:

$$\beta = A - \alpha + \arcsin(\sqrt{(n^2 - \sin^2 A)} \sin \alpha - \sin A \sin \alpha).$$

Herein, β is the deflection angle of the emergent light relative to the incident light, α is an included angle between an incident surface and an emergent surface in a prism unit structure, A is an incident angle of the light, and n is a refractive index of the prism.

In an embodiment of the present disclosure, after being refracted by the prism layer 8, the lights with different colors are perpendicularly incident on the sub-pixels with corresponding colors (which is realized by the above formula), thereby improving the transmittance of the light and thus ensuring that the light can be better transmitted out.

Optionally, the sub-pixel includes a plurality of groups. The plurality of first convex lenses, the plurality of second convex lenses, the plurality of prisms and the plurality of groups of sub-pixels are in one-to-one correspondence. The parallel light beam 5 includes light with three different colors, and any group of sub-pixels includes sub-pixels with a plurality of different colors. For example, any group of sub-pixels includes sub-pixels with three different colors (the colors of three different sub-pixels correspond to colors of three different kinds of light). After a light beam of the parallel light beam 5 passes through the refracting layer 7 and the prism, the lights with three colors are refracted out and are correspondingly refracted to the sub-pixels with three colors. Alternatively, any group of the sub-pixels includes sub-pixels with two different colors (the colors of two different sub-pixels correspond to the colors of two different kinds of light).

Herein, colors corresponding to the light with three different colors as well as the sub-pixels with three different colors may be selected as red, green and blue. The backlight source structure layer 1 includes a light guide plate 12, a light source 11 and a reflecting layer 13 that are sequentially arranged. The light guide plate 12 is arranged close to the first convex lens structure layer 2. A reflecting surface of the reflecting layer 13 faces towards the first convex lens structure layer 2.

Figure 3:
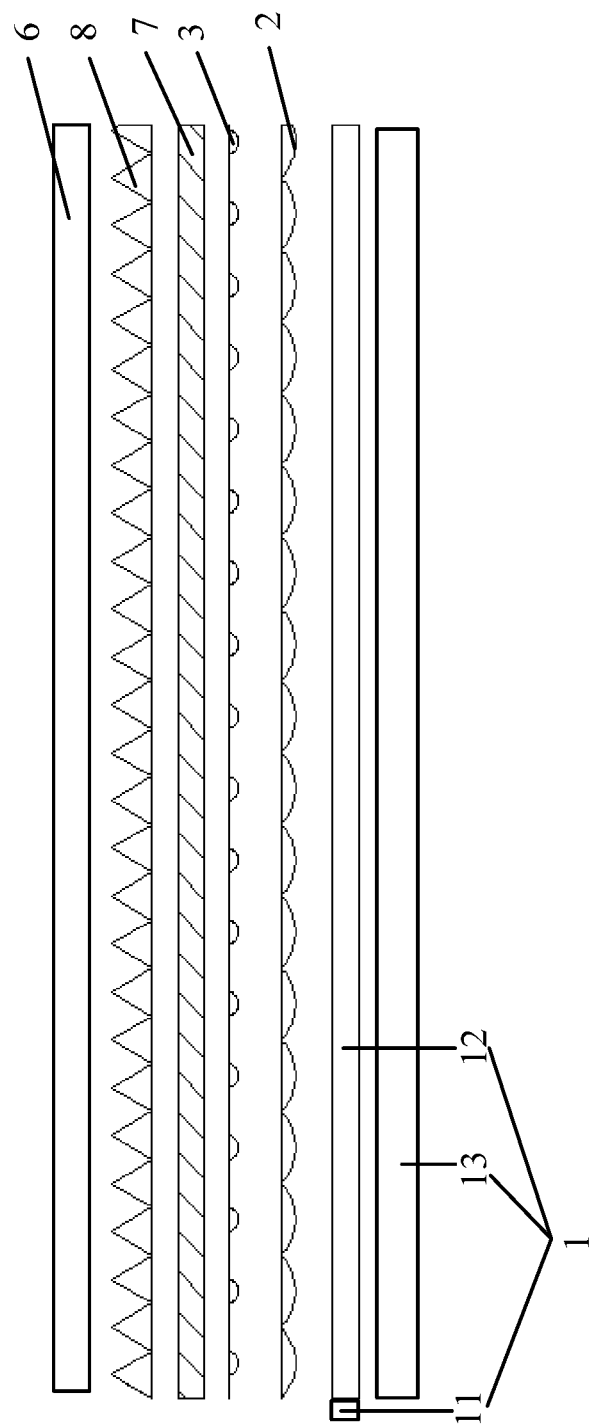
FIG. 3 is a schematic diagram of another structure of a backlight module illustrated by an embodiment of the present disclosure.

FIG. 3 shows a schematic diagram of another structure of a backlight module illustrated by an embodiment of the present disclosure.

In some embodiments, as shown in FIG. 3 and based on FIG. 1, the backlight source structure layer 1 may include the light guide plate 12, the light source 11 and the reflecting layer 13. The light guide plate 12 and the reflecting layer 13 are arranged sequentially. The light guide plate 12 is arranged close to the first convex lens structure layer 2. The reflecting surface of the reflecting layer 13 faces towards the first convex lens structure layer 2. The light source 11 is arranged on a side surface of the light guide plate 12.

The liquid crystal display device provided in the present disclosure includes the backlight module in any embodiment as mentioned above and a display panel. The backlight module is used to provide backlight for the display panel. The display panel includes the sub-pixels. The display panel may be a liquid crystal display panel.

The liquid crystal display device provided in the present disclosure has all advantages of the backlight module in any embodiment as mentioned above. The detailed description thereof is omitted herein.

Optionally, the display panel includes a plurality of pixels. Each of the pixels includes a plurality of sub-pixels with different colors. For example, each of the pixels includes at least three sub-pixels with different colors. The plurality of prisms arranged on the prism layer are in one-to-one correspondence with the plurality of pixels. The at least three sub-pixels with different colors include a red sub-pixel, a green sub-pixel and a blue sub-pixel, and an arrangement mode therein is the same as that in pixel colors of a current liquid crystal display device, which can be used universally.

Optionally, a diameter of the first convex lens is equal to a width of the pixel, i.e., a sum of widths of three sub-pixels, and a diameter of the second convex lens is ⅓-½ of the diameter of the first convex lens.

To sum up, in the backlight module provided in the present disclosure, the parallel lights emitted from the backlight source structure layer are converged to the focal point of the second convex lens structure layer after passing through the first convex lens structure layer, and then are transformed into the parallel light beam after passing through the second convex lens structure layer. The parallel lights are transformed to be in a convergence state from the original well-distributed state. The parallel light beam is then refracted for multiple times after passing through the prism layer to realize light splitting, so that lights with different colors are refracted. The lights with different colors are respectively incident on the sub-pixels with corresponding colors. Therefore, the transmittance of the light is improved and thus the purposes of increasing the energy efficiency utilization ratio and reducing the energy consumption of products are achieved.

There are provided in the present disclosure a backlight module and a liquid crystal display device, which have a high light utilization ratio, an excellent light transmittance, and a high energy efficiency utilization ratio, thereby being capable of reducing energy consumption and solving the problem of low light utilization ratio in the related art.

In the description of this specification, the terms "an embodiment", "some embodiments" and the like mean that the features, structures, materials or characteristics described with reference to embodiment(s) or example(s) are included in at least one embodiment or example of the present disclosure. The illustrative expressions of the above terms herein do not necessarily refer to the same embodiments or examples. Moreover, the described features, structures, materials or characteristics may be combined in any one or more embodiments or examples in any suitable manner.

Although embodiments disclosed herein are described as above, the contents therein are merely for facilitating the understanding of the present disclosure, rather than the limitation to the present disclosure. A person of ordinary skill in the art may make any modification and change to the implementations and details herein without departing from the spirit and scope of the present disclosure, and the protection scope of the present disclosure should be defined by the appended claims.

What is claimed is:
1. A backlight module, comprising:
a backlight source structure layer;

a first convex lens structure layer, a second convex lens structure layer and a prism layer that are sequentially arranged at a light-emergent side of the backlight source structure layer, wherein the first convex lens structure layer and the second convex lens structure layer are configured to converge parallel lights emitted from the backlight source structure layer into a parallel light beam;

the prism layer is configured to refract lights with different colors in the parallel light beam into sub-pixels with colors corresponding to the different colors; and a refracting layer arranged between the second convex lens structure layer and the prism layer and configured to refract the parallel light beam onto the prism layer, so that the parallel light beam perpendicularly incident on the refracting layer exits obliquely from the refracting layer, wherein the prism is a triangular prism, and a light-incident surface of the triangular prism is parallel to a light-emergent surface of the refracting layer.

2. The backlight module as claimed in claim 1, wherein a plurality of first convex lenses are arranged on the first convex lens structure layer; a plurality of second convex lenses are arranged on the second convex lens structure layer; a plurality of prisms are arranged on the prism layer; and a diameter of the first convex lens is greater than a diameter of the second convex lens.

3. The backlight module as claimed in claim 2, wherein focal points of the first convex lens and the second convex lens on opposite sides are overlapped;

wherein the first convex lens is configured to converge the parallel lights emitted from the backlight source structure layer to a focal point of the second convex lens close to the first convex lens;

the second convex lens is configured to converge divergent lights emitted at the focal point of the second convex lens into the parallel light beam and emit the parallel light beam onto the refracting layer; and the refracting layer is configured to refract the parallel light beam, so that the parallel light beam is incident on the prism at a specific angle.

4. The backlight module as claimed in claim 3, wherein the plurality of first convex lenses are arranged in a matrix; the plurality of second convex lenses are arranged in a matrix; and the plurality of prisms are arranged in a matrix.

5. The backlight module as claimed in claim 3, wherein the first convex lens and the second convex lens are plano-convex lenses; and both a convex surface of the first convex lens and a convex surface of the second convex lens are arranged close to the backlight source structure layer.

6. The backlight module as claimed in claim 3, wherein the plurality of first convex lenses, the plurality of second convex lenses and the plurality of prisms are in one-to-one correspondence.

7. The backlight module as claimed in claim 1, wherein the parallel lights emitted from the backlight source structure layer are white lights comprising red light, green light and blue light.

8. The backlight module as claimed in claim 1, wherein the prism is configured to split the lights with different colors in the parallel light beam through refraction for two times and make the refracted lights with different colors perpendicularly incident on the sub-pixels with corresponding colors.

9. The backlight module as claimed in claim 1, wherein the backlight source structure layer comprises a light source and a light guide plate that are sequentially arranged; and the light guide plate is arranged close to the first convex lens structure layer.

10. The backlight module as claimed in claim 1, wherein the backlight source structure layer comprises a light source and a light guide plate, and the light source is arranged at a side surface of the light guide plate.

11. The backlight module as claimed in claim 1, wherein the backlight source structure layer further comprises a reflecting layer, the reflecting layer is a film layer in the backlight source structure layer away from the first convex lens structure layer; and a reflecting surface of the reflecting layer faces towards the first convex lens structure layer.

12. A liquid crystal display device comprising a backlight module and a display panel, wherein the backlight module is configured to provide backlight for the display panel, and the display panel comprises the sub-pixels;

wherein the backlight module comprises:

a backlight source structure layer;

a first convex lens structure layer, a second convex lens structure layer and a prism layer that are sequentially arranged at a light-emergent side of the backlight source structure layer, wherein the first convex lens structure layer and the second convex lens structure layer are configured to converge parallel lights emitted from the backlight source structure layer into a parallel light beam;

the prism layer is configured to refract lights with different colors in the parallel light beam into sub-pixels with colors corresponding to the different colors; and a refracting layer arranged between the second convex lens structure layer and the prism layer and configured to refract the parallel light beam onto the prism layer, so that the parallel light beam perpendicularly incident on the refracting layer exits obliquely from the refracting layer, wherein the prism is a triangular prism, and a light-incident surface of the triangular prism is parallel to a light-emergent surface of the refracting layer.

13. The liquid crystal display device as claimed in claim 12, wherein the display panel comprises a plurality of pixels, and a plurality of prisms arranged on the prism layer are in one-to-one correspondence with the plurality of pixels.

14. The liquid crystal display device as claimed in claim 13, wherein each of the pixels comprises a plurality of the sub-pixels with different colors.

15. The liquid crystal display device as claimed in claim 14, wherein each of the pixels comprises at least three sub-pixels with different colors.

16. The liquid crystal display device as claimed in claim 15, wherein the at least three sub-pixels with different colors comprise a red sub-pixel, a green sub-pixel and a blue sub-pixel.

17. The liquid crystal display device as claimed in claim 15, wherein a diameter of the first convex lens is equal to a width of the pixel, and a diameter of the second convex lens is $1/3$-$1/2$ of the diameter of the first convex lens.

* * * * *